United States Patent Office 3,547,671
Patented Dec. 15, 1970

3,547,671
PROCESS FOR THE MANUFACTURE OF A RUTILE PIGMENT HAVING HIGH RESISTANCE TO GRAYING IN RESIN SYSTEMS
Gerhard Hitzemann, Giershofen, Post Dierdorf, Achim Kulling and Hans-Hermann Luginsland, Opladen, and Helmut Weber, Odenthal-Osenau uber Bergisch Gladbach, Germany, assignors to Titangesellschaft m.b.H., Leverkusen, Germany, a corporation of Germany
No Drawing. Filed Mar. 7, 1968, Ser. No. 711,197
Claims priority, application Germany, June 2, 1967, T 34,015
Int. Cl. C09c 1/36; C08g 51/04; C08k 1/06
U.S. Cl. 106—300
3 Claims

ABSTRACT OF THE DISCLOSURE

A process for the preparation of an improved type of rutile pigment which possesses increased photochemical stability in urea- or melamine-formaldehyde systems is prepared by the reaction of titanium tetrachloride with oxygen or a gas containing oxygen in a reaction chamber using an auxiliary flame. The reaction takes place at simultaneous presence of aluminum chloride and a phosphorus chloride and the reaction mixture immediately after the reaction, is cooled carefully by slowly mixing in a cold gas or by contact with coherent water film and subsequently the basis pigment body obtained is separated and subjected to a post-treatment with water soluble compounds of aluminum and silicon with precipitation of insoluble compounds.

BACKGROUND OF THE INVENTION

The photoactivity of rutile impairs the use of rutile pigments in many fields of application. For example, pressed laminate masses containing rutile pigment on melamine formaldehyde basis or pressed masses on the basis of urea- or melamine formaldehyde with worked-in rutile pigment show pronounced graying on exposure to light.

For some time attempts have been made to reduce the photoactivity by post-treatments of the rutile pigment. For example, the milled pigment is mixed in an aqueous slurry with water-soluble silicate and/or a water-soluble aluminum salt or other metal salts, then oxyhydrate or a silicate containing water is precipitated on the pigment by neutralization and the pigment is subsequently washed, dried and milled. Such a post-treated rutile pigment does not, however, exhibit a satisfactory increase of the photochemical stability in the systems mentioned.

According to a process described in the German Pat. No. 1,065,549 a post-treatment as described above is carried out with a combination of aluminum salt, silicate and cerium salt. The pigment manufactured according to this process shows, indeed, an improved photochemical stability but this still is insufficient for some fields of application. In addition, this treatment impairs the color tone of the pigment.

The suggestion has been made also to stabilize post-treated rutile pigment by a post-calcination (U.S. Pats. 2,671,031 and 3,035,066; British Pat. No. 1,007,448, German Auslegeschrift No. 1,214,817). By means of these processes the oxyhydrates applied in the post-treatment on the pigment are transformed into oxides or silicates.

A better photochemical stability is indeed achieved by means of these processes but this also is not sufficient in many cases.

For this reason two additional processes were developed in order to produce a pigment with still greater photochemical stability. According to one process a post-treated rutile pigment stabilized by post-calcination is post-treated a second time and another layer of oxyhydrates is applied (German Auslegeschrift 1,208,438). According to the other process a rutile pigment is, first of all, post-treated twice and subsequently subjected to a post-calcination (Dutch patent application 6604376). By means of these two processes it is, indeed, possible to manufacture rutile pigments of excellent photochemical stability. However, these processes are very expensive owing to the many processing steps that have to be carried out. Thus, there arose the desire of finding a possibility of manufacturing a pigment of the same or even better quality by a simpler method.

SUMMARY OF THE INVENTION

A new process has now been found for the manufacture of a rutile pigment with high resistance to graying in pressed laminate masses on melamine-formaldehyde basis or in pressed masses on the basis of urea or melamine-formaldehyde by the reaction of titanium tetrachloride with oxygen or a gas containing oxygen in a reaction chamber using an auxiliary flame. This process is characterized by the fact that the reaction takes place at simultaneous presence of aluminum chloride and a phosphorous chloride and that the reaction mixture, immediately after the reaction, is cooled carefully by slowly mixing in a cold gas or by contact with a coherent water film and that subsequently the basis pigment body obtained is separated and subsequently, in a manner known as such, subjected to a post-treatment with water-soluble compounds while precipitating out insoluble compounds.

DESCRIPTION OF THE PREFERRED EMBODIMENT

It was shown surprisingly that in carrying out the titanium tetrachloride reaction according to the invention a basic pigment body is obtained which has such good properties that only a simple post-treatment, known as such, with water-soluble compounds with the precipitation of insoluble compounds, for example, silica or hydrated aluminum oxide, without post-calcination, is sufficient in order to obtain a rutile pigment which is at least as valuable as the best pigments known at present for laminated pressed masses on melamine-formaldehyde basis and pressed masses on the basis of urea- or melamine formaldehyde. It shows not only an outstanding resistance to graying but also shows very good values for brightness and color tone in the systems mentioned owing to the relatively low drying temperature after the coating. Furthermore, the pigment produced according to the invention shows a superior dispersibility in comparison with pigments that had been subjected to post-calcination. Since only a single post-treatment without subsequent post-calcination is sufficient the process is simple and economically advantageous.

The titanium tetrachloride is reacted in the known manner in a reaction chamber employing an auxiliary flame. Furthermore, aluminum chloride and a phosphorous chloride in small amounts are introduced in the vapor phase wherein the addition is carried out together with the titanium tetrachloride. Phosphorous trichloride, phosphorous pentachloride or phosphorous oxychloride may, for example, be employed as phosphorous chloride. The pigment base obtained in the reaction should preferably contain 2–4% by weight $Al_2O_3$ and 0.5–3% $P_2O_5$.

The addition of aluminum chloride for the manufacture of rutile pigments for general application purposes is known (British Pat. No. 686,570). It is also known to post-treat titanium dioxide pigments with phosphate but in this case the phosphate is added afterwards on the finished pigment grain while in the process, according to the invention, the pigment grain is formed in the presence of a phosphorous chloride or its reaction products.

The addition of aluminum chloride and a phosphorous chloride produces by itself a certain improvement; however, an outstanding pigment is obtained only when, in addition, the reaction mixture is carefully cooled. Also, a limited improvement may be attained when in the formation of the pigment grain only aluminum chloride is added and the reaction mixture is carefully cooled. However, the additional application of a phosphorous chloride during the titanium tetrachloride reaction produces an additional improvement.

Under certain circumstances the rutilization is somewhat impeded by the addition of phosphorous chloride; this effect of the phosphorous chloride may, however, be compensated by an increase of the aluminum chloride amount or by other methods.

Immediately after the reaction of the titanium tetrachloride with the oxygen the reaction mixture shows a temperature of more than 1200° C. Usually this reaction mixture is quenched as fast as possible by blowing in a cold gas directly into the reaction mixture and thus cool it in a very short time until below 700° C. This method of procedure leads, however, to a basic pigment body which only by a multiplicity of subsequent procedural steps (one or more post-treatments and post-calcination) leads to a pigment with satisfactory resistance to graying.

However, for the manufacture of a good basic pigment body it is essential that in addition to the application of aluminum chloride and a phosphorous chloride the reaction mixture is carefully cooled. The duration of cooling and the temperature up to which the reaction mixture is cooled must be attuned to each other. The lower the reaction mixture is cooled, the greater should be the duration of cooling. The controlled cooling may be carried out in various ways. According to one method of procedure, for example, a cold gas is introduced directly into the hot reaction mixture, as soon as it evolves from the reaction chamber, in several in the same sense tangentially directed jets. The cold gas mixes slowly with the reaction mixture so that this is cooled only gradually. According to another procedure, cold gas introduced in countercurrent into the hot reaction mixture. This method of procedure is described in more detail in Belgian Pat. No. 690,993. The cooling of the reaction mixture may be influenced by the inlet temperature and the amount of the cold gas employed, as well as the arrangement of the discharge of the cooled reaction mixture. The reaction mixture should at the discharge still have a temperature of 700 to 900° C. It may then be cooled further in any known and desired manner prior to separating the titanium dioxide from the gas mixture.

Any gas may be employed as cold gas which is inert toward the reaction mixture under the prevailing conditions, e.g. air, nitrogen, carbon dioxide and chlorine. Particularly suitable are reaction product gases cooled and separated from titanium dioxide.

According to an additional process the hot reaction mixture may, after leaving the reaction chamber, be passed from the top downwards through a vertically arranged narrow tube, at the inner wall of which a film of water is maintained flowing in the same direction as the reaction mixture. In this procedure the reaction mixture is slowly cooled by the film of water. This procedure is described in the German Pat. No. 1,194,832.

The mentioned cooling processes may also be combined with each other. The separation of the titanium dioxide from the reaction mixture may be carried out in any desired manner. The titanium dioxide may either be separated wet, by being washed out with water, or titanium dioxide suspension from the reaction mixture. The separation may, however, be carried out also in the dry manner, for example, by cyclones, filters, electro-separators or by a fluidized bed.

The post-treatment of the basic pigment body is carried out in the known manner with substances known as such. In this the procedure is as follows:

The basic pigment body is slurried with water; if necessary, with the addition of a dispersing agent and alkali, subjected, as the case may be, to a wet milling and/or classification, and then mixed with an alkali silicate and/or a water-soluble aluminum salt and/or, as the case may be, one or more other non-colored and difficulty soluble compounds forming metal salts in any desired sequence. If the mixture is acid, alkali or ammonia is added up to at least neutral reaction. If the mixture is alkaline, then acid is added to at least neutral reaction. The pigment thus treated is filtered off, washed, dried and milled.

The amounts at which the substances for the post-treatment are applied are also known as such. In a preferred form of carrying out the process according to the invention a silicate and an aluminum salt in amounts of 0.5-10% by weight each, calculated as $SiO_2$ or $Al_2O_3$ and referred to the pigment are employed. As the case may be, additional other substances may be added in order to remove slight amounts of chlorine that originated in the titanium tetrachloride reaction, e.g. sodium bisulfite.

For the drying of the post-treated pigment, a temperature of 200–300° C. is particularly favorable. It is true that in some cases even at temperatures below 200° C. a good resistance to graying is attained but frequently it is not adequate. At drying temperatures above 300° C. the resistance to graying is not positively affected any more in most cases; on the other hand, brightness and color tone of the pigment in the laminated pressed material or in the pressed mass are impaired.

The invention will be explained in more detail by the following examples. Laminated pressed material were prepared with the rutile pigments for the tests. The procedure in this is given in detail as follows:

605 g. of a melamine-formaldehyde resin were dispersed in a mixture of 310 ml. ethyl alcohol and 364 ml. water while stirring vigorously. To 94 ml. of the solution obtained there were added 34 g. of the pigment and the mixture subsequently stirred for 10 minutes.

Unsized overlay papers are soaked in the pigment suspension and dried in a drying oven at 120° C. for 20 minutes. 16 layers of the dried papers are placed on top of each other and pressed between two chromium-plated and polished platens for 15 minutes at 145° C. and a pressure of 100 kp. per sq. cm. and subsequently cooled under pressure to 20° C.

The following characteristics of the finished plates were tested: Brightness and color tone prior to the exposure to light as well as graying. For this purpose the remission of the plates were determined first by means of an electric remission photometer employing a green filter, a blue filter and a red filter. The values thus determined were designated as $R_G$, $R_B$ and $R_R$. $R_G$ was a measure for the brightness, the difference $R_B - R_R$ being a measure for the color tone of the pressed plate. The more positive this difference was, the more the measured plate showed the desirable blue under tone. Subsequently the plates were exposed in a testing device for stability to light by means of a Xenon lamp for 10 hours, wherein they were turned at regular intervals. After exposure the remission was again measured with a green filter. The decrease of the remission measured with the green filter compared with that of the unexposed plate represented the graying values, i.e. a measure for graying.

EXAMPLE 1

100 kg. per hr. titanium tetrachloride, 26 standard cu. m. per hr. oxygen and 12 standard cu. m. per hr. carbon monoxide were reacted in a reaction chamber; 4.0 kg. per hr. aluminum chloride and 1.6 kg. per hr. phosphorous trichloride were added to the titanium tetrachloride; the basic pigment body contained 3.4% $Al_2O_3$ and 2% $P_2O_5$. The reaction mixture was slowly cooled by a device according to German Pat. No. 1,194,832 by a water film, wherein the conical cooling tube had a length of 1800 mm., an upper diameter of 170 mm. and a lower diameter of 80 mm. and a water throughput was 4 cu. m. per hr. Into the reaction mixture thus precooled, subsequently additional 2.6 cu. m. per hr. water were sprayed in. The suspension thus obtained was freed of chlorine residues by passing air through it and was concentrated by decanting. After this it was post-treated as follows:

1 liter of the suspension corresponding to 300 g. $TiO_2$ was heated to 60° C. and dispersed with the addition of soda lye as well as a mixture of sodium hexametaphosphate and monoisopropanolamine as dispersing aid at a pH of ca. 10, while stirring. After this 26.5 ml. of a sodium silicate solution, which contained 188 g.p.l. $SiO_2$ corresponding to an amount of 1.8% $SiO_2$, referring to $TiO_2$, and 76 ml. of an aluminum sulfate solution with a content of 79 g.p.l. $Al_2O_3$, corresponding to 2.1% $Al_2O_3$ referring to $TiO_2$, were successively added while stirring continuously and maintaining the temperature at 60° C. Subsequently the suspension was mixed with continued stirring with an aqueous ammonia solution to a pH of 8.3 and the pigment was filtered off after additional stirring for one hour, washed and dried for 16 hours in a drying oven at 200° C. The pigment was then milled. The pigment obtained was designated as pigment A.

EXAMPLE 2

Example 1 was repeated with the difference that no phosphorous trichloride was added and that the amount of aluminum chloride was 3.4 kg. per hr.; the basic pigment body contained 2.8% $Al_2O_3$. The pigment obtained was designated as pigment B. In Table 1 the pigments A and B are compared with a rutile pigment which had been obtained according to the German Auslegeschrift 1,208,438 from a basic pigment body produced by hydrolysis of a titanium sulfate solution by a first post-treatment with 1.8% $SiO_2$ and 2.1% $Al_2O_3$, a post-calcination at ca. 700° C. and a second post-treatment with 1% $SiO_2$ and 2% $Al_2O_3$ (pigment C).

kg. per hr. aluminum chloride were added to the titanium tetrachloride; the basic pigment body contained 3% $Al_2O_3$. Immediately after finishing the reaction the mixture was cooled by reaction product gases from the reaction which had been freed from $TiO_2$ and cooled to ambient temperature. For this purpose the hot reaction mixture was passed from the top to a mixing chamber; directly at its entrance into the mixing chamber 120 standard cu. m. per hr. reaction product gas from the reaction were added in two, in the same sense tangentially directed gas currents while additional 80 standard cu. m. per hr. reaction product gas were added from below. The reaction mixture cooled to 900° C. was discharged at the side and the basic pigment body was separated with water from the reaction mixture. The suspension obtained was freed from chlorine residues, and post-treated as in Example 1. The pigment obtained is designated as pigment D.

EXAMPLE 4

The reaction took place as in Example 3. The reaction mixture produced was passed from the top into a mixing chamber as in Example 3 and cooled by 300 standard cu. m. per hr. reaction product gas freed from titanium dioxide and cooled to ambient temperature. The reaction product gas had been introduced from below into the mixing chamber as per Belgian Pat. No. 690,993 in counter-current toward the reaction mixture. The reaction mixture was then drawn off from the mixing chamber at a temperature of 760° C. and treated further as in Example 3. The pigment obtained is designated pigment E.

EXAMPLE 5

The procedure was the same as in Example 3 with the following deviations: the amount of reaction product gas introduced into the upper part of the reaction chamber was 320 standard cu. m. per hr.; the reaction product gas introduced from below was 110 standard cu. m. per hr. Besides that the first-named amount of reaction product gas was introduced in two tangential gas currents which had not the same, but opposite sense of rotation. This

TABLE 1

| Pigment | Manufacture of the basic pigment body | Post-treatment | Graying value | Brightness $R_G$ | Color tone $R_B - R_R$ |
|---|---|---|---|---|---|
| A (Example 1) | $TiCl_4$ reaction with addition of $PCl_3$. | 1.8% $SiO_2$+2.1% $Al_2O_3$ drying at 200° C. | 2.5 | 91.2 | −2.8 |
| B (Example 2) | $TiCl_4$ reaction without $PCl_3$ addition. | 1.8% $SiO_2$+2.1% $Al_2O_3$ drying at 200° C. | 6.4 | 91.1 | −4.6 |
| C (DAS) 1,208,438 | Hydrolysis of a titanium sulfate solution. | 1. 1.8% $SiO_2$+2.1% $Al_2O_3$ post-calcination at 700° C. 2. 1% $SiO_2$+2% $Al_2O_3$. | 4.0 | 90.3 | −5.5 |

It can be seen from the table that the pigment A made according to the invention is not only equivalent but even superior to a known special pigment C although in contrast to this pigment it had been post-treated only once and had not been post-calcined. The positive effect of the phosphorous addition can be preceived by a comparison of pigment A with pigment B.

procedure effected a very rapid cooling of the reaction mixture in the upper part of the mixing chamber. The drawn off reaction mixture had a temperature of 690° C. and was separated and post-treated as in Example 3; in this pigment F was obtained.

In Table 2 the pigments D, E and F are compared with each other:

TABLE 2

| Pigment | Cold gas addition | Cooling of the reaction mixture | Graying value |
|---|---|---|---|
| D (Example 3) | From above, tangential in the same sense. | Slowly to 900° C. | 4.9 |
| E (Example 4) | In counter-current from below. | Slowly to 760° C. | 5.7 |
| F (Example 5) | From above, tangential in opposite sense. | Rapidly to 690° C. | 1.3 |

The effect of cooling of the reaction mixture produced in the titanium tetrachloride reaction will be shown by the following examples:

EXAMPLE 3

500 kg. per hr. titanium tetrachloride, 94 standard cu. m. per hr. oxygen and 38 standard cu. m. per hr. carbon monoxide were reacted in a reaction chamber wherein 18

It can be seen from the comparison of pigments D and E, on one hand, and pigment F, on the other hand, that the slow cooling, according to the invention, of the reaction mixture produces a considerably improved resistance to graying of the pigment.

While this invention has been described and illustrated by the examples shown, it is not intended to be strictly

What is claimed is:
1. In a process for the manufacture of a rutile pigment with high resistance to graying in laminated pressed masses on melamine-formaldehyde basis, or in pressed masses on the basis of urea- or melamine-formaldehyde, by reacting titanium tetrachloride with oxygen or a gas containing oxygen in a reaction chamber using an auxiliary flame, in which the reaction is carried out in the presence of aluminum chloride and that subsequently the basic pigment body obtained is separated and then subjected to a post-treatment with water-soluble compounds of aluminum and silicon with precipitation of the corresponding insoluble compounds, the improvement which comprises adding phosphorous chloride along with the aluminum chloride so that the titanium dioxide is formed in the presence of said aluminum and said phosphorous compounds thus forming simultaneously oxidic compounds of aluminum and phosphorous as said titanium dioxide is formed and slowly cooling the resultant oxides and the reacted gases from a temperature above 1200° C. to a temperature between 700° C. and 900° C.; the amounts of aluminum chloride and phosphorous chloride added to the titanium tetrachloride being sufficient to form from 2% to 4% $Al_2O_3$ and from 0.5% to 3% $P_2O_5$ based on the weight of the titanium dioxide pigment formed and the amounts of water soluble compounds of aluminum and silicon added at a post-treatment being sufficient form from 0.5% to 10% $Al_2O_3$ and from 0.5% to 10% $SiO_2$.

2. Process according to claim 1 in which phosphorous trichloride is employed as the phosphorous chloride.

3. Process according to claim 1 in which the drying is carried out preferably at 200–300° C.

References Cited

UNITED STATES PATENTS

| | | | |
|---|---|---|---|
| 2,760,938 | 8/1956 | Dempster et al. | 106—300X |
| 2,771,345 | 11/1956 | Tanner | 106—300UX |
| 2,817,595 | 12/1957 | Kalinowski | 106—300 |
| 3,329,483 | 7/1967 | Evans et al. | 106—300X |
| 3,363,981 | 1/1968 | Butler | 106—300X |
| 3,382,042 | 5/1968 | Richardson et al. | 106—300X |
| 3,391,998 | 7/1968 | Groves et al. | 106—300X |
| 3,443,897 | 5/1969 | Wilson et al. | 106—300X |

TOBIAS E. LEVOW, Primary Examiner

H. M. S. SNEED, Assistant Examiner

U.S. Cl. X.R.

106—308; 260—39